US012000368B2

(12) United States Patent
Nam et al.

(10) Patent No.: US 12,000,368 B2
(45) Date of Patent: Jun. 4, 2024

(54) SMALL HYDROPOWER GENERATOR OF NOVEL CONCEPT, USING FERRIS WHEEL

(71) Applicants: Sung Ho Nam, Daegu (KR); Myung Suk Lee, Daegu (KR)

(72) Inventors: Sung Ho Nam, Daegu (KR); Myung Suk Lee, Daegu (KR)

( * ) Notice: Subject to any disclaimer, the term of this patent is extended or adjusted under 35 U.S.C. 154(b) by 602 days.

(21) Appl. No.: 17/612,420

(22) PCT Filed: Jul. 29, 2019

(86) PCT No.: PCT/KR2019/009442
§ 371 (c)(1),
(2) Date: Nov. 18, 2021

(87) PCT Pub. No.: WO2020/036339
PCT Pub. Date: Feb. 20, 2020

(65) Prior Publication Data
US 2022/0220930 A1 Jul. 14, 2022

(30) Foreign Application Priority Data

Aug. 13, 2018 (KR) .................. 10-2018-0094168

(51) Int. Cl.
F03B 7/00 (2006.01)
H02K 7/18 (2006.01)
(52) U.S. Cl.
CPC ........ *F03B 7/003* (2013.01); *F05B 2220/706* (2013.01); *H02K 7/1823* (2013.01)

(58) Field of Classification Search
CPC .... F03B 7/003; F03B 11/00; F05B 2220/706; F03G 3/08; F03G 3/094; H02K 7/1823; Y02E 10/20
(Continued)

(56) References Cited

U.S. PATENT DOCUMENTS 169,112 A * 10/1875 Lindley .................. F03B 7/003
415/125
4,253,795 A * 3/1981 McQueen ............... F03B 7/003
415/125
(Continued)

FOREIGN PATENT DOCUMENTS

JP 2016023628 A 2/2016
KR 20070051192 A 5/2007
(Continued)

Primary Examiner — Julio C. Gonzalez
(74) Attorney, Agent, or Firm — Maschoff Brennan

(57) ABSTRACT

A small hydropower of a novel concept, comprising: two side supports; a main rotation axis provided on the upper end between the two side supports; a rotation body for rotating around the main rotation axis; fillable-then-emptiable water containers which are provided around the circumference of the rotation body, remain horizontally level, add weight by being filled with a certain amount of water when positioned at the top center of the rotation body during rotation, and remove the weight by spilling when positioned at the bottom center; a selective water supply device which can provide, to a fillable-then-emptiable water container that is positioned at the top center of the rotation body, water, and which temporarily stops discharging water until the next fillable-then-emptiable water container is positioned, if one fillable-then-emptiable water container is completely filled.

7 Claims, 10 Drawing Sheets

(58) Field of Classification Search
USPC .......................................... 60/639, 495, 398
See application file for complete search history.

(56) References Cited

U.S. PATENT DOCUMENTS

| | | | | |
|---|---|---|---|---|
| 4,440,427 | A | * | 4/1984 | Felton ..................... F03B 7/003 |
| | | | | 415/5 |
| 5,430,332 | A | * | 7/1995 | Dunn, Jr. .............. F03B 17/063 |
| | | | | 290/43 |
| 2012/0001433 | A1 | * | 1/2012 | Mowad ................ F03B 17/005 |
| | | | | 415/916 |
| 2016/0201643 | A1 | | 7/2016 | Blake |

FOREIGN PATENT DOCUMENTS

| | | |
|---|---|---|
| KR | 100781721 B1 | 12/2007 |
| KR | 101642876 B1 | 7/2016 |

* cited by examiner dam to naturally flow a certain amount of water downward and/or rivers or streams, in which water naturally flows downward, are still used with ignoring the waste of water.

SMALL HYDROPOWER GENERATOR OF NOVEL CONCEPT, USING FERRIS WHEEL

TECHNICAL FIELD

The present invention relates to a hydropower generator of a new concept using the principle of Ferris wheel, which is more efficient than conventional waterwheels.

Background Art

Conventionally, hydroelectric power, tidal power, thermal power, nuclear power, wind power, solar power, etc. are widely known as a method of producing electricity.

Thereamong, thermal power generation a nuclear power generation have a great ability to produce electricity, however, these require huge energy consumption, high technology, manpower and advanced operational equipment, as well as high costs for installation and maintenance. In particular, since there is a dysfunction that generates pollutants harmful to the human body and environment, these facilities should be gradually suppressed or reduced henceforward.

On the other hand, wind, solar and/or hydropower generators are harmless to humans and the environment, which are green energy capable of producing a certain amount of power, thereby being encouraged as items for population by the government.

In particular, the hydroelectric generator is a facility to produce electricity through conversion of potential energy of water into kinetic energy, and is one of the facilities that are greatly helpful for the demand and supply of eco-friendly green energy by utilizing rivers, streams or dams distributed throughout the country.

Further, a rotary body ("rotor") commonly used in a hydroelectric generator may include a torsion wing type rotor such as a fan blade or a propeller that directly faces water flow in a completely submerged state in water. However, in most cases, a watermill or waterwheel type rotor is used, which allows rotation while a part of the periphery continuously touches the water flow or a head of water.

Among such waterwheel type rotors known in the art, the invention of Korean Patent Registration No. 10-1460063 (power generation waterwheel) may be exemplified.

However, such a waterwheel type rotor is operated to rotate by intensively applying a flow rate or a head of water to the periphery or edges of wings disposed radially at a predetermined equiangular interval. Further, due to a construction in which a shape of the outer edge of the wing continuously undergoing the resistance of water is opened to the outside, only a small part of the flow rate of the flowing water or the head of water falling from the top to the bottom may be converted into energy efficiency, whereas the remaining part flows away. That is, the conventional rotor involves a very wasteful structure.

Specifically, in the case of a hydroelectric generator using the existing watermill or waterwheel type rotor, yielded energy efficiency is extremely low compared to an amount of water supplied to the flow rate or the head of water. Therefore, a dam to naturally flow a certain amount of water downward and/or rivers or streams, in which water naturally flows downward, are still used with ignoring the waste of water.

After all, a generator using such a conventional watermill or waterwheel is significantly lower in terms of energy efficiency compared to an amount of water to be introduced, and therefore, can be used only in a specific place and environment where water waste is not considered.

For this reason, a generator using a waterwheel type rotor is only employed intermittently in power generation projects that are performed on a large scale in specific places in which dams or rivers where only a little amount of energy may need to be taken with ignoring the waste of water are utilized. In fact, it is currently impossible to widely distribute the above generator to domestic general business operators or people, unlike solar power generation projects.

Further, the above generator is substantially not suitable for recent energy development policy with regard to small-scale hydroelectric power generation with a structure that can produce electricity with a small water stream (that is, a small scale hydropower plant which may be easily installed in a reservoir, a small river or stream, etc., and can also be easily installed without involving large-scale civil engineering work, thereby overcoming all environmental problems while attaining economical advantages, and being useful for widespread use).

On the other hand, Ferris wheel is a ride (or a play tool), which is equipped with several boarding spaces for people to ride around the periphery of a large circular rotating body, and rotates at a low speed so that the people can enjoy the surrounding scenery or the view from a high location while having a special leisure time. Therefore, this is limited in use since it does not have any special or productive role or function other than amusement purpose of the people riding as described above.

DISCLOSURE

Technical Problem

Accordingly, unlike the existing waterwheel type rotor that causes a huge waste of water, the present invention may expect higher energy and generation efficiency even with a small amount of water since the entire amount of introduced water acts as a resistance required for rotation according to the principle of the Ferris wheel. Therefore, the present invention is focused on providing a new concept hydropower generator using a Ferris wheel that can expect very effective and significant generation efficiency even in places where water supply is very limited or narrow places, thereby solving the above technical problems and completing the present invention.

Technical Solution

In order to solve the above technical problems, the present invention provides a new concept small hydropower generator, including: both supports 10 which are built up to a predetermined height from the ground to provide a strong support base of a main rotational shaft 110; the main rotational shaft 110 installed on the strong support base at an upper end between the above both supports 10; a rotor 100 rotating at a predetermined rotating speed in a predetermined radial range with respect to the main rotational shaft 110; several water filling-then-emptying buckets ("water bucket") 200 which are arranged around the periphery of the rotor 100 at constant equiangular intervals, wherein the bucket is always horizontally balanced during rotation, and wherein, when placed at the top center of the rotor 100 during rotation, the bucket is filled with a predetermined amount of water to imply the weight and, when placed at the bottom center of the rotor, the weight is removed by pouring out the water; a selective water supply device 300 that supplies water drawn from a relatively small scale river or stream to the water bucket 200 located in the center of the upper center of the rotor 100, wherein, after completely filling one of the buckets 200 with water, the selective water supply device 300 stops water discharge temporarily until the next bucket 200 is positioned; and a generator 400 installed on one side of the main rotational shaft 110 disposed in the center of the rotor 100 to convert rotational kinetic energy output from the rotor 100 into electrical energy.

Advantageous Effects

As described above, the new concept hydropower generator using a Ferris wheel according to the present invention may minimize the waste of water while extremely maximizing output energy efficiency to thus make it meaningless LC) compare the present invention with the existing generators, since the introduced water entirely serves as the weight and rotation driving source required for rotation of the rotor. Therefore, the generator of the present invention may be easily installed and operated even in a place where an amount of flowing water is relatively low, which may have a greater expectation such as significant contribution nationwide distribution of small scale hydropower generators.

BEST MODE

Figure 1:
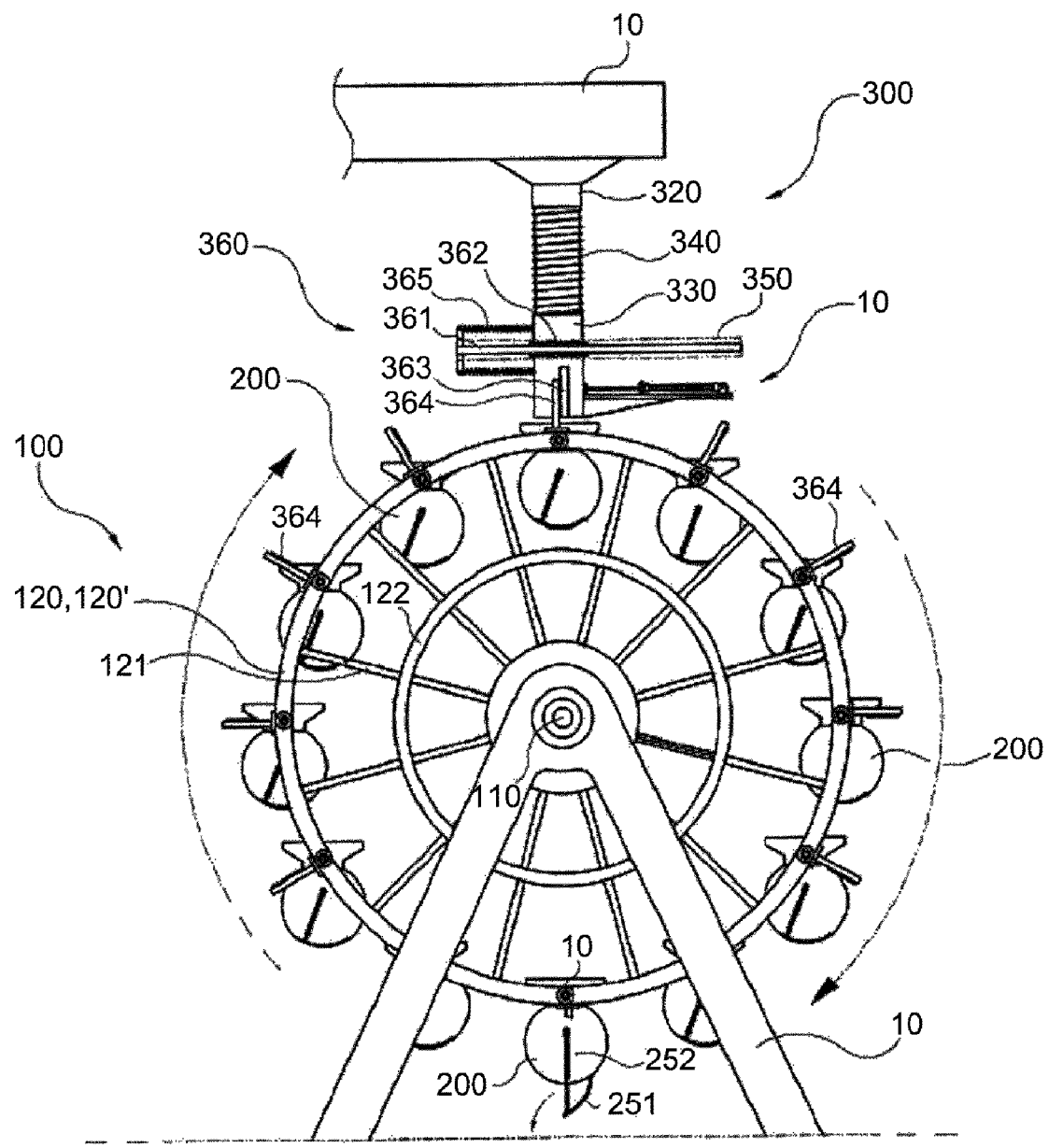
FIG. 1 is a front view of the entire structure illustrating a referred embodiment of the present invention.
Figure 2:
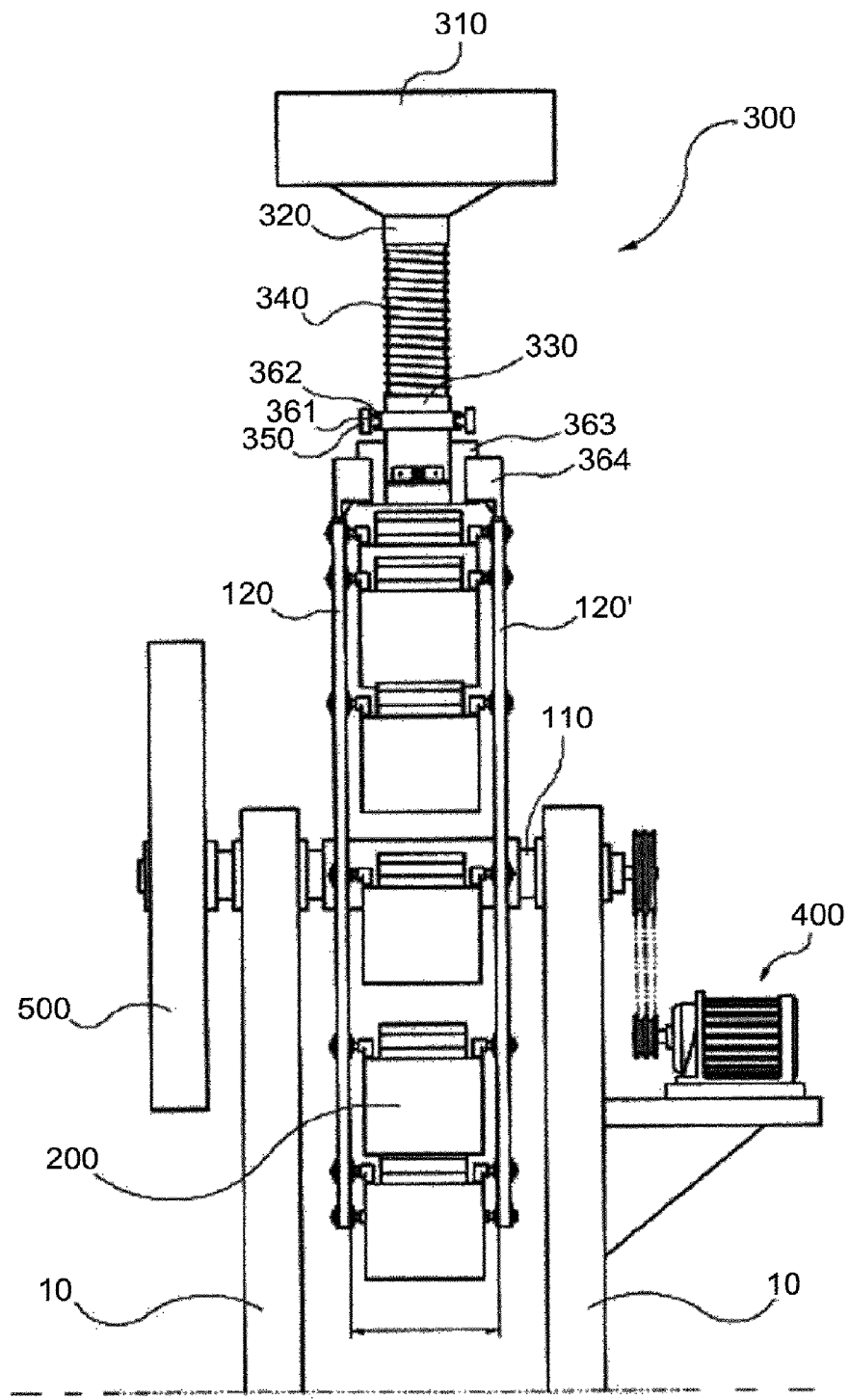
FIG. 2 is side view of the entire structure illustrating a preferred embodiment of the present invention.
Figure 3:
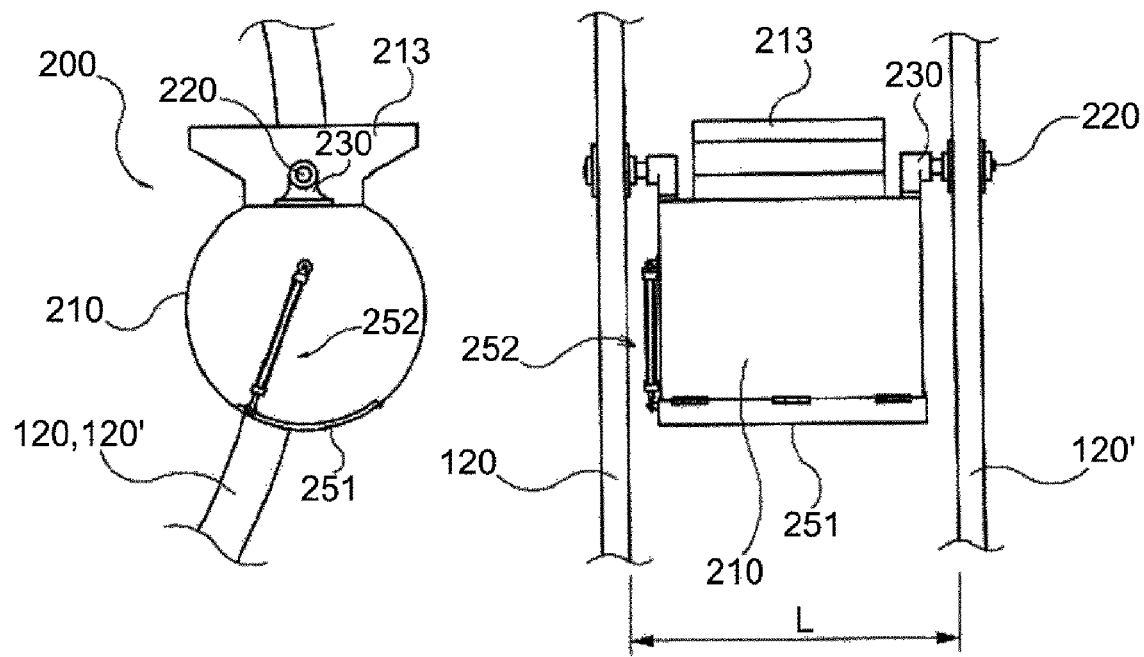
FIG. 3 is an exemplary view of installation of a water filling-then-emptying bucket ("water bucket") proposed by the present invention.
Figure 4:
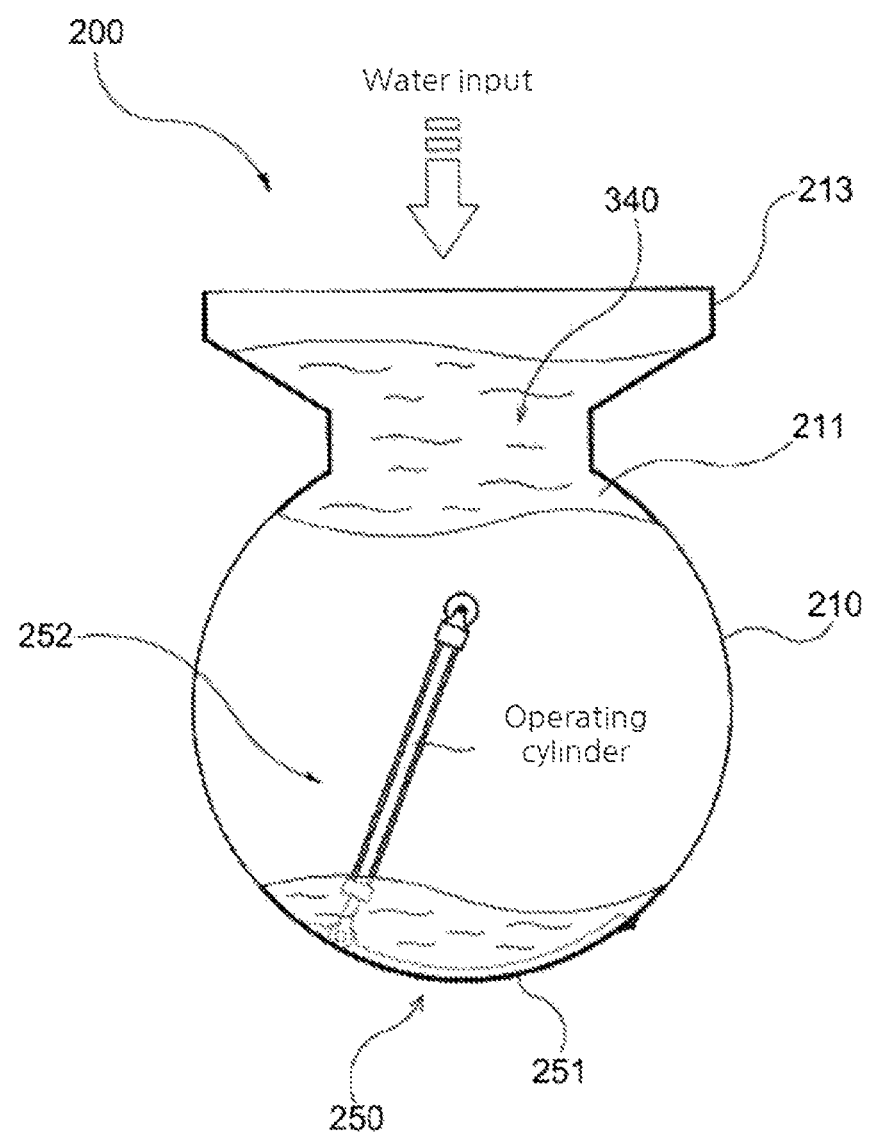
FIGS. 4 and 5 are each enlarged views illustrating a state in which water is introduced into and discharged out of the bucket proposed by the present invention.
Figure 5:
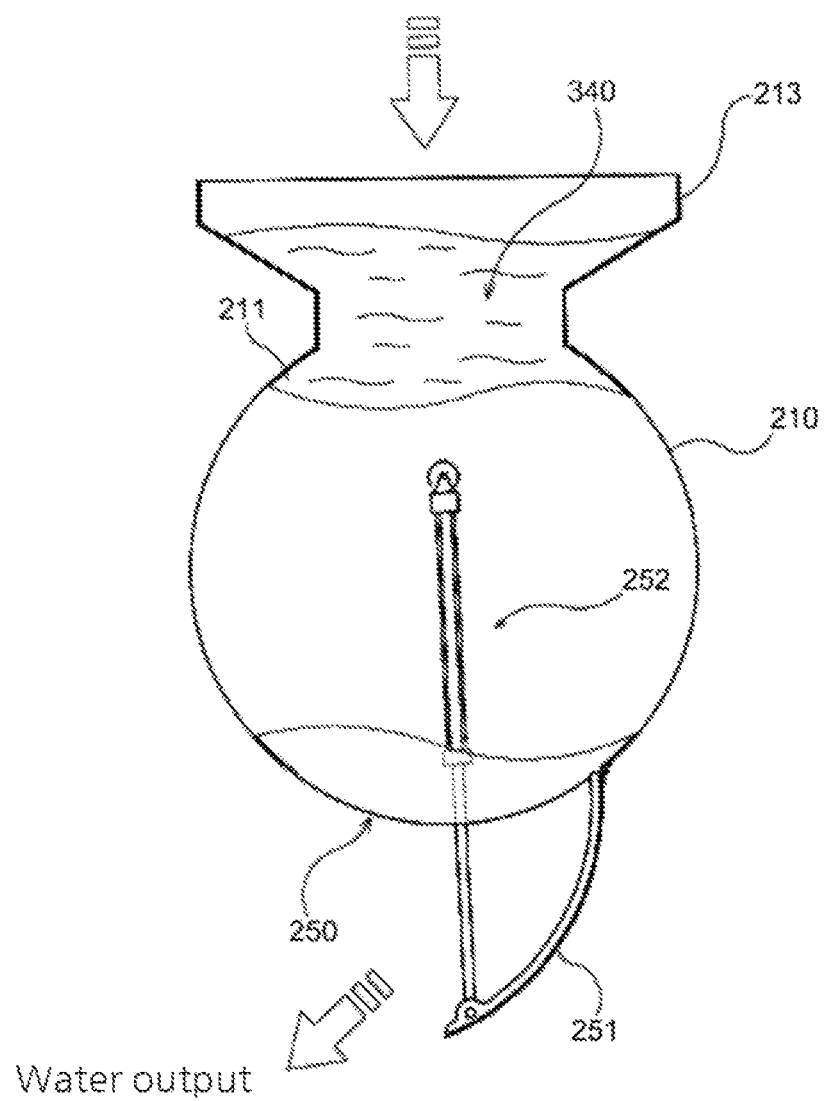

Hereinafter, the most preferred embodiment of the present invention will be described in detail. Specifically, the present invention may propose a new concept small hydropower generator using a Ferris wheel, including: both supports 10 built up to a constant height from the ground to provide a strong support base of a main rotational shaft 110; the main rotational shaft 110 installed under the strong support base at an upper end between the both supports 10; a rotor 100 rotating at a predetermined rotating speed in a predetermined radial range with respect to the main rotational shaft 110; several water filling-then-emptying buckets ("water bucket") 200 which are arranged around the periphery of the rotor 100 at constant equiangular intervals, wherein the bucket is always horizontally balanced during rotation, and is filled with a predetermined amount of water to imply a weight when placed at the top center of rotor 100 during rotation while, when placed at the bottom center of the rotor, the weight is removed by pouring out the water; a selective water supply device 300 that supplies water drawn from a relatively small scale river or stream to the water bucket 200 located in the center of the upper center of the rotor 100, wherein, after completely filling one of the buckets 200 with water, the selective water supply device 300 stops water discharge temporarily until the next bucket 200 is positioned; and a generator 400 installed on one side of the main rotational shaft 110 disposed in the center of the rotor 100 to convert rotational kinetic energy output from the rotor 100 into electrical energy.

DETAILED DESCRIPTION OF PREFERRED EMBODIMENTS OF INVENTION

The new concept hydropower generator using a Ferris wheel of the present invention will be described in more detail with reference to the accompanying drawings.

The present invention may include: both supports 100 built up to a constant height from the ground to provide a strong support base of a main rotational shaft 110;
the main rotational shaft 110 installed under the strong support base at an upper end between the both supports 10;
a rotor 100 rotating at a predetermined rotating speed in a predetermined radial range with respect to the main rotational shaft 110;
several water filling-then-emptying buckets ("water bucket") 200 which are arranged around the periphery of the rotor 100 at constant equiangular intervals, wherein the bucket is always horizontally balanced during rotation, and is filled with a predetermined amount of water to imply weight when placed at the top center of the rotor 100 during rotation while, when placed at the bottom center of the rotor, the weight is removed by pouring out the water;
a selective water supply device 300 that supplies water drawn from a relatively small scale river or stream to the water bucket 200 located in the center of the upper center of the rotor 100, wherein, after completely filling one of the buckets 200 with water, the selective water supply device 300 stops water discharge temporarily until the next bucket 200 is positioned; and
a generator 400 installed on one side of the main rotational shaft 110 disposed in the center of the rotor 100 to convert rotational kinetic energy output from the rotor 100 into electrical energy.

<Flywheel>

Further, at the other side of the main rotational shaft 110 disposed in the center of the rotor 100, a flywheel 500 may further be usefully provided to assist the rotor 100 to stably rotate at a predetermined speed during rotation.

<Rotor>

The rotor 100 may include: front and rear wheel-shaped outer frames ("outer frames") 120 and 120', which are arranged around a periphery in a predetermined radial range with respect to the main rotational shaft 110 while being maintained with a constant width interval (L) at the front and rear sides; a plurality of rods 121 and reinforcement frames 122 installed between the outer frames 120 and 120' and the main rotational shaft 110, so as to achieve a rotational structure with a strong framework and overall balance of strength and supporting force.

<Water Filling-then-Emptying Bucket>

The water bucket 200 may be installed between the front and rear wheel-shaped outer frames 120 and 120', which have a strong framework formed as described above and maintain a constant width interval (L) between the front and rear sides. Further, although rotating around the periphery of the rotor 100, a horizontal level is always maintained. Further, when positioned at the top center of the rotor 100 during rotation, the water bucket is filled with a predetermined amount of water to imply a considerably high weight and rotate downward by half a cycle along the circumstance. On the other hand, when reaching the bottom center, all the water contained in the bucket is poured out to completely eliminate the weight and thus rotate upward by the remaining half of the cycle along the circumference in an empty state.

The water bucket 200 may include: a water container 210 in which a water containing space ("water space") 211 to contain a predetermined amount of water is allocated; and a rotation support 230 provided at an upper end of each of one side and the other side of the water container 210, which is coupled by a rotational shaft 220 in order to always maintain a horizontal state since mutually free-rotation is possible between the rotational support 230 and the front and rear wheel-shaped outer frames 120 and 120'. In particular, a water input part 240 and a water output part 250, respectively, may be disposed at top and bottom ends of the water container 210, so as to fill the water container with water at the top center of the rotor 100 and discharge the water from the water container at the bottom center of the rotor.

At this time, the water input part 240 configured on the top side of the water container 210 may have a water inlet 212 perforated to communicated with the water space 211 inside the water container and, if necessary, the water inlet may further be provided with a water guide hopper 213, which has an inlet greatly enlarged to enhance stability of water introduction.

For the water output part 250 configured on the bottom of the water container 210, a water discharge door 251 may be installed to open the water container, rapidly discharge the water from the water container 210 at a time, and then close the same again after completing the discharge.

The water discharge door 251 may further be provided with a door opening/closing means ("door switch") 252, wherein the door switch can be any one selected from: a manual switch to be directly opened and closed by a user; a mechanical automatic switch enabling automatic opening/closing operation through a mechanical mechanism; and a full-automatic switch driven by electric and electronic signals to enable automatic opening/closing operation.

Figure 6:
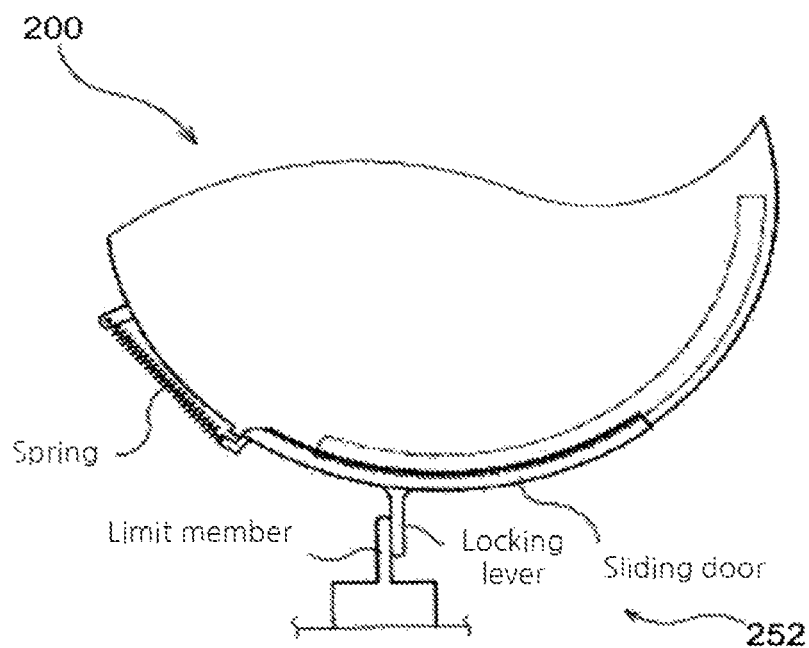
FIG. 6 is an exemplary view illustrating a mechanical automatic opening/closing means ("switch") of a door opening/closing device indicated in the present invention as an example.
Figure 6:
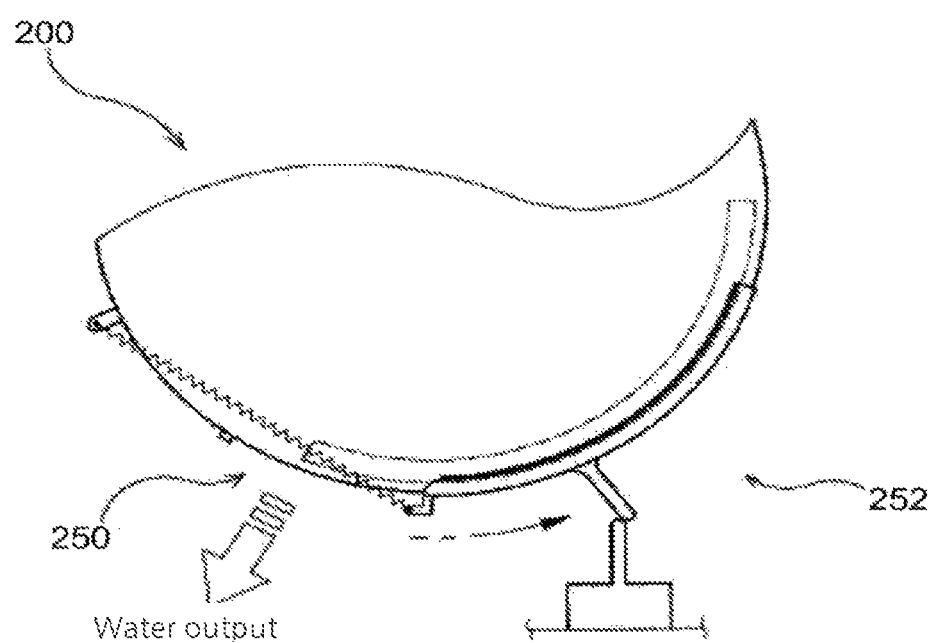

In this regard, the manual switch (not shown) may include a hinge configured at one side of the door 251, as well as a handle and a hook means that can be hooked after closing the door mounted on the opposite side of the door. For the mechanical automatic switch (see FIG. 6), it may be designed with a configuration in which a door for opening/closing the water filling-then-emptying bucket ("water bucket") 200 may be firstly configured in the form of a sliding door, then, a locking lever may be provided on the bottom and a limit member may be provided at an alternative lower portion corresponding to the locking lever so that, when the water bucket 200 rotates, the above two elements contact to each other to automatically open the door, and a spring may be connected between the water bucket 200 and the door such that the sliding door can be automatically closed after discharging water. Alternatively, in the case of the full-automatic switch, it may be designed with a configuration in which an operating cylinder (air cylinder, hydraulic cylinder, etc.) may be provided to have a push motion according to a sensor signal and a program input to an electric and electronic control unit (since the manual switch, mechanical automatic switch and/or full-automatic switch is a means capable of opening and closing a door and, in addition to the above structure, others may be selected among a variety of door opening/closing devices, which are commonly used in daily life, therefore, a detailed description thereof will be omitted).

Figure 7:
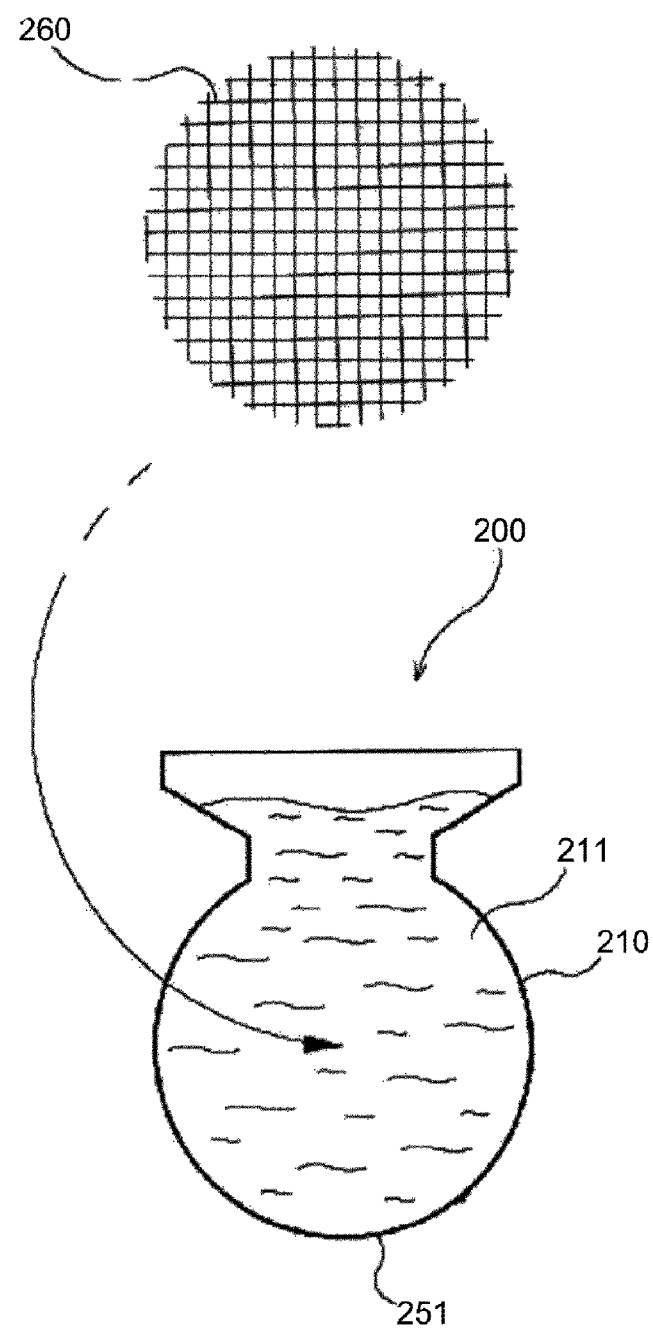
FIG. 7 is an exemplary view illustrating installation of a water flow stabilization net in the water bucket according to the present invention.
Figure 8:
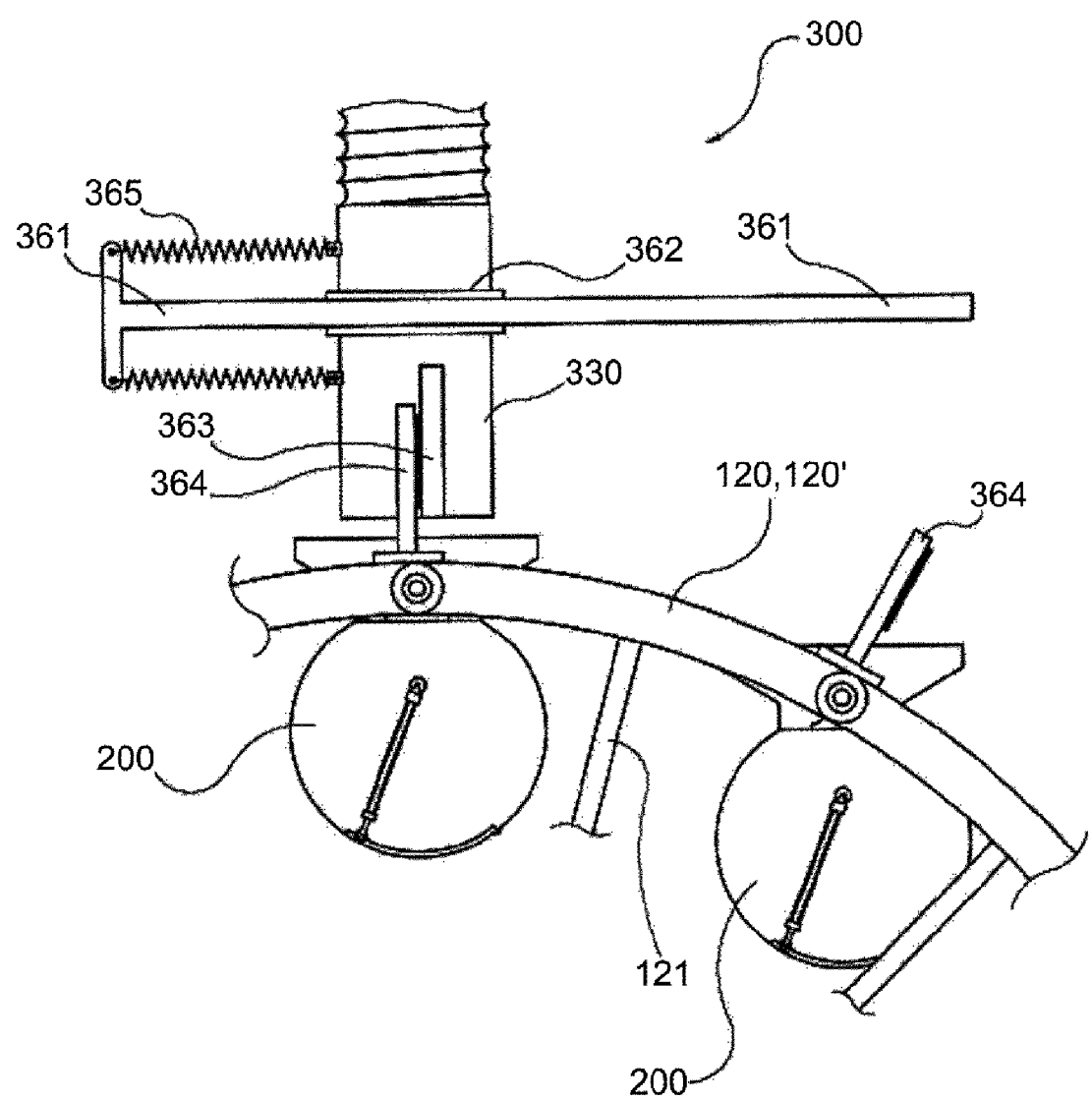
FIGS. 8 to 11 are exemplary views illustrating a configuration and operation relationship of the selective water supply device indicated in the present invention.
Figure 9:
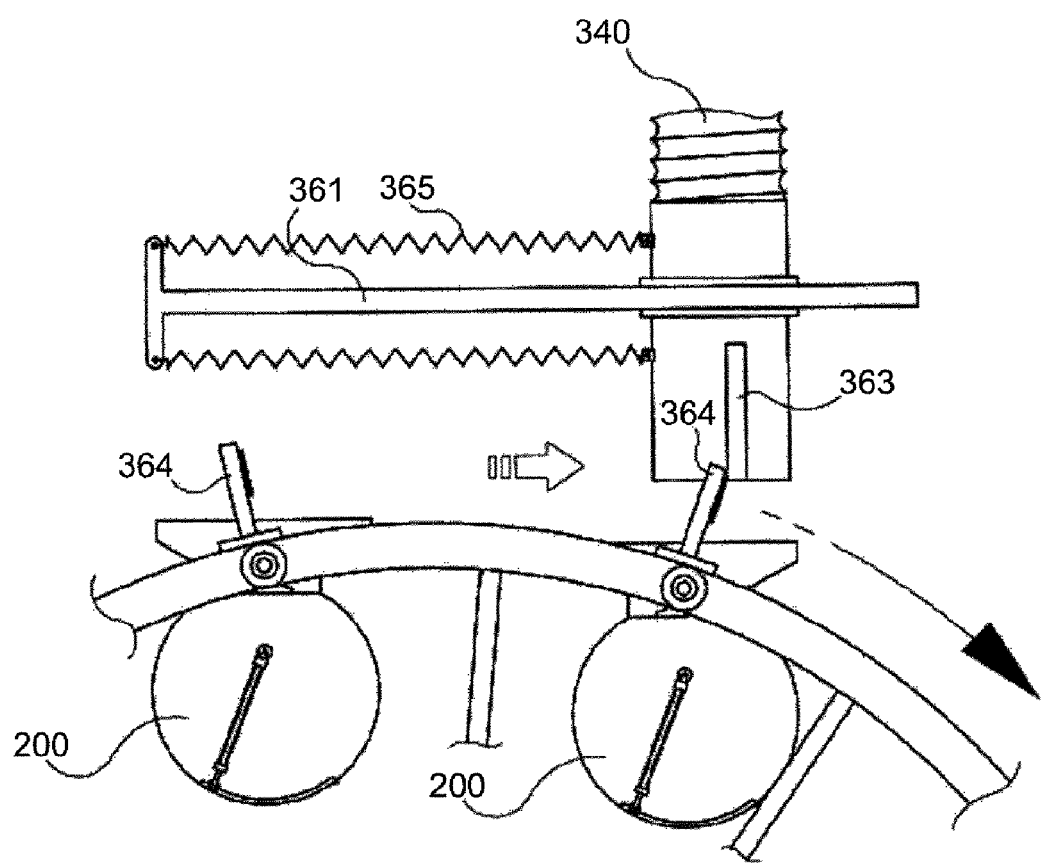
Figure 10:
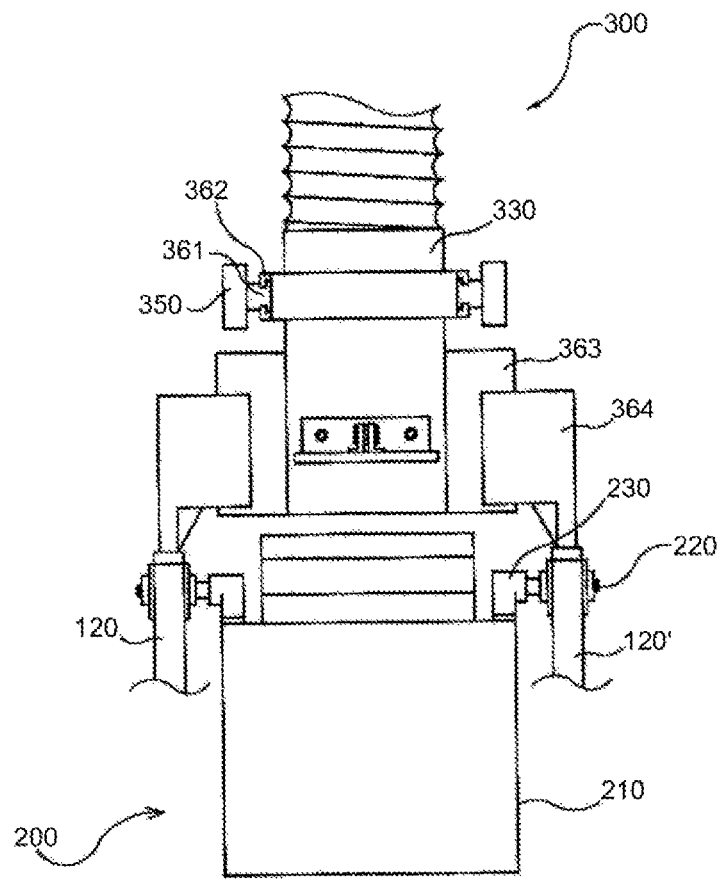
Figure 11:
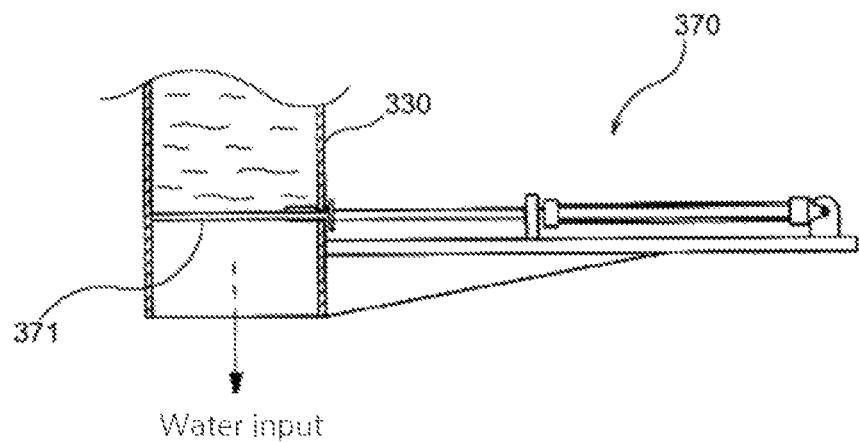

Further, as shown in FIG. 7, a water flow stabilization net 260 in a lattice shape cross-woven in horizontal and vertical directions may be provided in the water space 211 inside the water container 210, whereby shaking or waving of the water introduced into the water space 211 possibly appearing during water introduction or rotation of the water bucket 200 could be suppressed as much as possible, and may be helpful for stabilization and maintaining uniformity.

<Selective Water Supply Device>

Further, the selective water supply device 300 is a device for filling water into the water space 211 of the water bucket 200 disposed in the top center of the rotor 100.

In the selective water supply device 300, a waterway unit 310 to draw water from a river or stream distributed in the domestic surrounding area may be constructed, and a water down-drawing pipe 320 at one side of the waterway unit 310 to draw water downward from the waterway unit 310 may further be provided.

A water input pipe 330 may be firstly mounted on a lower portion maintained at a constant interval from the water down-drawing pipe 320, then, a flexible element 340 such as a flexible hose or corrugated pipe may be connected between the water down-drawing pipe 320 and the water input pipe 330. Further, the water input pipe 330 connected by the flexible element 340 and a support member 350 separately constructed on one side of the water input pipe 330 may be provided with a left and right horizontal transport means 360 capable of moving a position of the water input pipe 330 in a horizontal direction by a predetermined interval and then turning back to the original position.

The horizontal transport means 360 may include a horizontal transport rail 361 configured on the support member 350 which can be separately constructed. Further, the water input pipe 330 corresponding thereto may be provided with a guide block 362 that can move horizontally while being engaged with the horizontal transport rail. Further, a locking member 363 may protrude on the front or rear side of the water input pipe 330 that can have horizontal movement to the left and right by the above configuration. Further, a contact lever member 364 may be configured on the front and rear wheel-shaped outer frames 120 and 120' corresponding to the locking member 363, wherein contact is naturally released due to a change in height naturally appearing in a process of pushing the locking member 363 in a rotating direction when moving in an arc according to the rotation of the rotor 100 and then moving in an arc section. Further, a resilient return-spring 365 may be provided between the water input pipe 330 and the support member 350, both of which are maintained at a constant interval, so as to return the water input pipe 330 its original position after movement thereof.

Further, a water input control switch 370 may be mounted on a lower portion of the water input pipe 330, wherein this switch temporarily stops the introduction of water after introducing water into one of the water buckets 200 and then until water is introduced again into the next one.

The water input control switch 370 may also be designed to manually or automatically push a switch plate 371, which in turn opens/closes the same, in the same structure and principles as the door switch 252 mounted on the water discharge door 251.

When the selective water supply device 300 is configured as described above, water drawn from a river or stream through the waterway unit 310 may be supplied and filled into the water filling-then-emptying bucket 200 positioned in the top center of the rotor 100 without waste. Further, owing to the flexible element 340 and the left and right horizontal transport means 360 between the water down-drawing pipe 320 and the water input pipe 330, when introducing water into the rotating water bucket 200, the water input pipe 330 may introduce water into the water bucket while moving in a horizontal direction by a constant interval until the water bucket 200 is completely filled with water. Therefore, water can be introduced and the water bucket may be fully filled with the water even while rotating along with the rotor.

After one of the water buckets 200 is completely filled with water, the water bucket may be returned to its original position by the resilient return-spring 365 and then water filling of the next one may immediately begin again.

<Generator>

The generator 400 is a device for converting rotational kinetic energy output from the rotor 100 into electric energy, wherein one or several generators can be connected to one side of the rotational shaft 110 through a power transmission means (gear, chain, sprocket, etc.), and wherein the capacity and quantity of the generator may vary depending on the output force and, if possible, the capacity and quantity of the generator relative to the output are preferably set to an extent that allows low-speed rotation of the rotor 100.

In other words, when a rotating speed of the rotor 100 is set to move at the lowest speed using a resistance of the generator 400, water introduction and discharge may be more smoothly performed during rotation of the rotor 100.

<Description of Function>

The new concept small hydropower generator using a Ferris wheel of the present invention may introduce water, which is drawn from a river or stream using a waterway unit 310, into a water filling-then-emptying bucket 200 during 360 degree rotation of a rotor 100, and discharge the water filled in the water bucket 200 to the outside when the water bucket rotates half a cycle (180 degrees) and is located at the lowest end of the bottom, whereby the waste of water is suppressed as much as possible, while greatly increasing energy efficiency to thus make it meaningless to compare the present invention with the existing generators. Therefore, the present invention is very useful.

In addition, the rotor 100 is preferably manufactured as a large circular body around a single main rotational shaft 100 as proposed above but, if necessary, the rotor may be formed with a configuration such that rotational shafts are provided in two sites, that is, on the top and bottom sides of the rotor while maintaining a constant interval, and in a way that the rotor rotates along a caterpillar track between the above two rotational shafts (not shown).

The invention claimed is:

1. A hydropower generator using a Ferris wheel, comprising:
   opposite supports having a predetermined height from a ground to provide a support base of a main rotational shaft;
   the main rotational shaft installed under the strong support base at an upper end between the opposite supports;
   a rotor rotating at a predetermined rotating speed in a predetermined radial range with respect to the main rotational shaft;
   a plurality of water buckets which are arranged around a periphery of the rotor at equiangular intervals to repeat filling and emptying each of the plurality of water buckets while the rotor rotates with respect to the main rotational shaft, wherein each of the plurality of water buckets is configured to always maintain horizontal level during rotation, each of the plurality of water buckets is filled with a predetermined amount of water to have a weight when placed at a top center of rotor during rotation while each of the plurality of water buckets is emptied by pouring out the water when placed at a bottom center of the rotor, and the weight is removed by pouring out the water;
   a selective water supply device that supplies water drawn from a river or stream to each of the plurality of water buckets located in a center of an upper portion of the rotor, wherein, after completely filling one of the plurality of water buckets with water, the selective water supply device stops water discharge temporarily until the next bucket of the plurality of buckets is positioned; and
   a generator installed on one side of the main rotational shaft disposed in a center of the rotor to convert rotational kinetic energy output from the rotor into electrical energy,
   wherein the selective water supply device comprises:
      a waterway unit to draw water from a river or stream, as well as a water down-drawing pipe at one side of the waterway unit to draw water downward from the waterway unit;
      a water input pipe installed on a lower portion at a predetermined interval from the water down-drawing pipe, wherein the water input pipe is provided with a guide block that can move horizontally while being engaged with a horizontal transport rail;
      a flexible element including a flexible hose or a corrugated pipe connected between the water down-drawing pipe and the water input pipe, wherein the water input pipe is connected by the flexible element and a support member separately constructed on one side of the water input pipe with transport means capable of moving a position of the water input pipe in a horizontal direction by a predetermined interval and then turning back to the original position, and wherein the transport means includes the horizontal transport rail configured on the support member which can be separately constructed;
      a locking member that protrudes on a front side or a rear side of the water input pipe,
      a contact lever member on a front wheel-shaped outer frame and a rear wheel-shaped outer frame corresponding to the locking member, wherein contact is released due to a change in height appearing in a process of pushing the locking member in a rotating direction when moving in an arc depending on the rotation of the rotor and then moving in an arc section; and
      a resilient return-spring between the water input pipe and the support member, wherein the water input pipe and the support member are both maintained at a predetermined interval to allow the water input pipe to be returned to a predetermined position thereof after movement thereof.

2. The hydropower generator according to claim 1, wherein, at the other side of the main rotational shaft disposed in the center of the rotor, a flywheel is provided to assist the rotor to rotate at a predetermined speed during rotation.

3. The hydropower generator according to claim 1, wherein each of the plurality of water buckets is installed at predetermined intervals between front and rear wheel-shaped outer frames, which are maintained with a predetermined width interval (L) at front and rear sides, wherein each of the plurality of water buckets is always horizontally balanced even while rotating along an outer of the rotor, and wherein, when positioned at the top center of the rotor during rotation, each water bucket of the plurality of water buckets is filled with a predetermined amount of water to have a predetermined weight and rotate downward by a half circle along the circumference of the rotor, and, when reaching at the bottom center, all the water contained in each respective bucket of the plurality of water buckets is poured out to completely eliminate the weight and thus rotate upward by the remaining half of the circle along the circumference in an empty state.

4. The hydropower generator according to claim 1, wherein each water bucket includes:
- a water container in which a water containing space to contain a predetermined amount of water is allocated;
- a rotation support provided at an upper end of the water container, which is coupled by a rotational shaft in order to always maintain a horizontal state; and
- a water input part and a water output part, respectively, which are disposed at top and bottom ends of the water container to fill the water container with water at the top center of the rotor and discharge the water from the water container at the bottom center of the rotor.

5. The hydropower generator according to claim 4, wherein:
- the water input part configured on a top side of the water container has a water inlet perforated to be communicated with the water space inside the water container, the water inlet being provided with a water guide hopper, which has an inlet enlarged to enhance stability of water introduction; and
- the water output part configured on the bottom of the water container includes a water discharge door having a door switch, which is installed to open the water container, rapidly discharge the water from the water container at a time, and then close the water discharge door after completing the discharge.

6. The hydropower generator according to claim 4, wherein a water input control switch is mounted on a lower portion of the water input pipe, wherein the water input control switch temporarily stops introduction of water after introducing water into one of the plurality of water buckets until water is introduced into another one of the plurality of water buckets.

7. The hydropower generator according to claim 5, wherein the door switch is a mechanical automatic switch, and the mechanical automatic switch is designed with a configuration in which:
- a door for opening/closing the plurality of water buckets is configured in the form of a sliding door; a locking lever is provided on the bottom; and a limit member is provided at an alternative lower portion corresponding to the locking lever such that, when the water bucket rotates, the locking lever and the limit member contact each other to automatically open the door and a spring connects the water bucket and the sliding door such that the sliding door automatically closes after discharging water.

* * * * *